United States Patent
Lee

(10) Patent No.: US 11,516,520 B2
(45) Date of Patent: Nov. 29, 2022

(54) DATA SHARING SYSTEM, SHARE LIST PROCESSING METHOD, AND NON-TRANSITORY MACHINE-READABLE MEDIUM FOR DATA SHARING

(71) Applicant: Laixion Network Technology Inc., Taipei (TW)

(72) Inventor: Yang Lee, Taipei (TW)

(73) Assignee: LAIXION NETWORK TECHNOLOGY INC., Taipei (TW)

( * ) Notice: Subject to any disclaimer, the term of this patent is extended or adjusted under 35 U.S.C. 154(b) by 0 days.

(21) Appl. No.: 17/033,230

(22) Filed: Sep. 25, 2020

(65) Prior Publication Data
US 2021/0092465 A1  Mar. 25, 2021

(30) Foreign Application Priority Data
Sep. 25, 2019 (TW) .................... 108134681

(51) Int. Cl.
| | | |
|---|---|---|
| *H04N 21/231* | (2011.01) | |
| *H04N 21/488* | (2011.01) | |
| *H04L 9/40* | (2022.01) | |
| *H04N 21/258* | (2011.01) | |
| *H04N 21/45* | (2011.01) | |
| *H04N 21/4788* | (2011.01) | |

(52) U.S. Cl.
CPC ......... *H04N 21/231* (2013.01); *H04L 63/08* (2013.01); *H04N 21/25875* (2013.01); *H04N 21/4532* (2013.01); *H04N 21/4788* (2013.01); *H04N 21/4882* (2013.01)

(58) Field of Classification Search
CPC ............ H04N 21/231; H04N 21/4882; H04N 21/25875; H04N 21/4532; H04N 21/4788; H04N 21/4753; H04N 21/632; H04L 63/08; H04L 63/083; H04W 12/08; H04W 12/069
See application file for complete search history.

(56) References Cited

U.S. PATENT DOCUMENTS

| | | | | |
|---|---|---|---|---|
| 2009/0113472 A1* | 4/2009 | Sheth | ........................ | H04N 7/10 |
| 2009/0177772 A1* | 7/2009 | Guan | ........................ | G06F 15/16 |
| 2009/0290715 A1* | 11/2009 | Mityagin | .................. | H04L 9/32 |
| 2011/0288910 A1* | 11/2011 | Garg | ........................ | G06Q 30/00 |

* cited by examiner

*Primary Examiner* — Anthony Bantamoi
(74) *Attorney, Agent, or Firm* — Muncy, Geissler, Olds & Lowe, P.C.

(57) ABSTRACT

A data sharing system includes a first sharer terminal, a receiver terminal and a service server. The service server is configured to receive a first sharer identity data, a first sharing command and a identity verification which is one of a share characteristic and a first shared data from the first sharer terminal. The service server, according to the first sharer identity data, the first sharing command and a share request, adds a new share list, or saves, modifies, or deletes at least one share list saved in a list storage module.

26 Claims, 5 Drawing Sheets

DATA SHARING SYSTEM, SHARE LIST PROCESSING METHOD, AND NON-TRANSITORY MACHINE-READABLE MEDIUM FOR DATA SHARING

FIELD OF DISCLOSURE

The present invention relates to a data sharing system, a share list processing method, and a non-transitory machine-readable medium for data sharing, particularly to the data sharing system, the share list processing method, and the non-transitory machine-readable medium for data sharing capable of adding, saving, modifying or deleting a share list and correspondingly provide a share function according to a share request.

BACKGROUND

With the development of network technology and mobile terminal devices, online video platforms and live streaming platforms have brought more immediate video services and social experiences to people in recent years. In the past, online video sharing could be achieved by a point-to-point communication or a point-to-multipoint communication. Video providers, such as online streamers, upload videos on the platforms and subscribers then visit the platforms to view the video content. The audiences (subscribers) had a direct relationship with the streamers. For example, an online streamer can invite other streamers, friends and audiences and broadcast online together. Under the current technology, the online video platforms and the live streaming platforms only allow subscribers to view the videos on the channels of the online streamers, which they subscribe to on the online video platforms and the live streaming platforms. Nevertheless, the subscribers cannot view the video content of other streamers, friends and audiences who broadcast online together with the streamers because they are not the subscribers of other streamers, friends and audiences. The subscribers need to respectively subscribe to the channels of other streamers, friends and audiences on the online video platforms and the live streaming platforms, so as to receive notifications for new shared videos later. This type of video sharing is still the point-to-point communication or the point-to-multipoint communication. However, some video activities are conducted by multiple streamers for a particular event at a specific time. These activities are multipoint-to-multipoint communications. In this circumstance, the viewer must subscribe to the channels of all streamers in the video activities to receive instant notification for new video sharing, but they need to cancel or edit their subscription list by themselves after the activities. It is quite troublesome.

Therefore, the management of multipoint-to-multipoint sharer lists is a critical issue which need to be solved an urgent problem to be solved in the field of online videos.

SUMMARY

In regard to the influence of this issue, the present invention provides a data sharing system, a share list processing method, and a non-transitory machine-readable medium for data sharing.

In one embodiment, the data sharing system includes: a first sharer terminal, including an input module, a processing module, a communication module, a display module, wherein the input module is configured to receive a first sharer identity data, a first sharing command, and one of a share characteristic and a first shared data; at least one receiver terminal, including an input module, a processing module, a communication module and a display module, wherein the input module is configured to receive a share request; and a service server, including an identity verification module configured to receive and verify the first sharer identity data, and to save the share characteristic; a list storage module, configured to save a plurality of share lists; a list management module, according to the first sharer identity data, the first sharing command and the share request, generating one of the plurality of share lists, or accessing, modifying, deleting, or saving at least one of the plurality of share lists which are saved in the list storage module; a data storage module, configured to save the first shared data; a function providing module, generating a share function list according to the share characteristic, and transmitting the share function list to the receiver terminal; a function exestuation module, configured to execute a share function corresponding to one of the plurality of share lists; a notification module, generating a share data review notification according to the first shared data to the at least one receiver terminal, wherein the at least one receiver terminal generates a share data review request to the data storage module, and the data storage module provides the first shared data according to the share data review request to the at least one receiver terminal In one embodiment, the share list processing method for a first sharer terminal, a receiver terminal, and a service server, includes the steps of: receiving a first sharer identity data via the service server from the first sharer terminal; verifying the first sharer identity data via the service server; receiving a share request via the service server from the receiver terminal; and according to the first sharer identity data and the share request, adding, saving, modifying or deleting at least one share list via the service server.

In one embodiment, the share list processing method for a first sharer terminal, a receiver terminal, a second sharer terminal, and a service server, includes the steps of: receiving a first shared identity data via the service server from the first sharer terminal; verifying the first shared identity data via the service server; receiving a first sharing command via the service server from the first sharer terminal, wherein the first sharing command includes a command of defining at least one common sharing terminal, wherein the at least one common sharing terminal includes the second sharer terminal; receiving the first sharing command via the second sharer terminal, and transmitting a sharing consent command via the second sharer terminal; obtaining a first share list and a second share list respectively in the service server according to the first sharing command and the sharing consent command, wherein the first share list includes a receiver identity data; and adding a common share list via the service server according to the first sharing command and the sharing consent command, wherein the common sharing list including content of the first share list and the second share list.

In one embodiment, the share list processing method for a first sharer terminal, a receiver terminal, a second sharer terminal, a service server, includes the steps of: receiving a first sharer identity data via the service server according to the first sharer terminal; verifying the first sharer identity data via the service server; receiving a first sharing command via the service server from the first sharer terminal, wherein the first sharing command include a command of defining at least one common sharing terminal, wherein the at least one common sharing terminal includes the second sharer terminal; obtaining share characteristics of the first sharer terminal and the second sharer terminal via the service server according to the first sharing command, and determining whether the share characteristics of the first sharer terminal and the second sharer terminal are identical or not, if yes, transmitting the first sharing command to the second sharer terminal; receiving the first sharing command via the second sharer terminal, and transmitting a sharing consent command via the second sharer terminal; obtaining a first share list and a second share list in the service server according to the first sharing command and the sharing consent command, wherein the first share list includes a receiver identity data; and incorporating the first share list into the second share list according to the first sharing command and the sharing consent command via the service server.

In one embodiment, the non-transitory machine-readable medium, including an executable command to enable one or more processing units to perform a share list processing method for a first sharer terminal, a receiver terminal, a service server, the method comprising the steps of: receiving a first sharer identity data via the service server from the first sharer terminal; verifying the first sharer identity data via the service server; receiving a share request via the service server from the receiver terminal; and according to the first sharer identity data and the share request, adding, saving, modifying or deleting at least one share list via the service server.

In one embodiment, the non-transitory machine-readable medium, including an executable command to enable one or more processing units to perform a share list processing method for a first sharer terminal, a receiver terminal, a second sharer terminal and a service server, the method comprising the steps of: receiving a first shared identity data via the service server from the first sharer terminal; verifying the first shared identity data via the service server; receiving a first sharing command via the service server from the receiver terminal, wherein the first sharing command includes a command of defining at least one common sharing terminal, wherein the at least one common sharing terminal includes the second sharer terminal; receiving the first sharing command via the second sharer terminal, and transmitting a sharing consent command via the second sharer terminal; obtaining a first share list and a second share list respectively in the service server according to the first sharing command and the sharing consent command, wherein the first share list includes a receiver identity data; and adding a common share list via the service server according to the first sharing command and the sharing consent command, wherein the common sharing list including content in the first share list and the second share list.

In one embodiment, the non-transitory machine-readable medium, including an executable command to enable one or more processing units to perform a share list processing method for a first sharer terminal, a receiver terminal, a second sharer terminal and a service server, the method comprising the steps of: receiving a first sharer identity data via the service server from the first sharer terminal; verifying the first sharer identity data via the service server; receiving a first sharing command via the service server from the receiver terminal, wherein the first sharing command includes a command of defining at least one common sharing terminal, wherein the at least one common sharing terminal includes the second sharer terminal; obtaining share characteristics of the first sharer terminal and the second sharer terminal via the service server according to the first sharing command, and determining whether the share characteristics of the first sharer terminal and the second sharer terminal are identical or not, if yes, transmitting the first sharing command to the second sharer terminal; receiving the first sharing command via the second sharer terminal, and transmitting a sharing consent command via the second sharer terminal; obtaining a first share list and a second share list in the service server according to the first sharing command and the sharing consent command, wherein the first share list includes a receiver identity data; and incorporating the first share list into the second share list according to the first sharing command and the sharing consent command via the service server.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
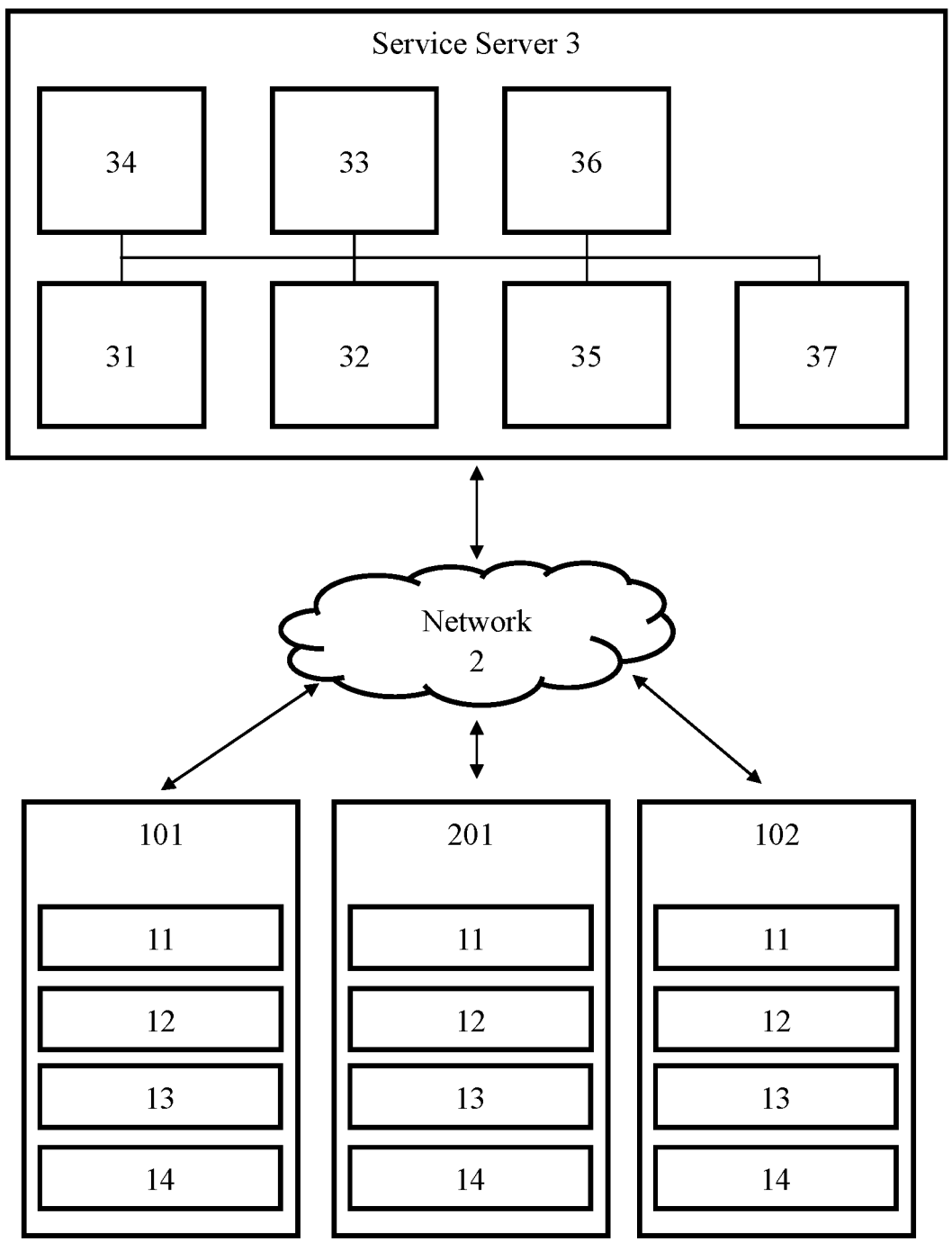
FIG. 1 is a schematic diagram illustrating a data sharing system, in accordance with one embodiment of the present invention.

In FIG. 1, in one embodiment, the present invention provides a data sharing system including a first sharer terminal 101, a receiver terminal 201, a second sharer terminal 102, a network 2, and a service server 3.

The first sharer terminal 101 includes an input module 11, a processing module 12, a communication module 13, and a display module 14. The input module 11 is configured to receive a first sharer identity data, a first sharing command, and one of a share characteristic, and a first shared data. The input module 11 can be at least a touch screen, a touch panel, a mouse, a keyboard, a microphone, a microphone, or any device used to receive input data or operating commands from the user. The input data can be text, images or sound, such as first sharer identity data, streaming videos, streaming music, photos, text or the combination thereof. The input module 11 can be applied by the user to input a share characteristic. The share characteristic can be personal information, activity, game, sports, shopping, auction, traversal, drama, entertainment, life, performance, or news. The operating instruction can be an operating command of a terminal or a sharing command. The sharing command can be a command to share, upload, modify or delete a share list. The input module 11 can also allow the user to input a share request or a sharing consent command. The first sharer identity data can include an identity code and a password. The identity code can be an account number, an e-mail address, a telephone number, a universally unique identifier, a globally unique identifier, an international mobile subscriber identity, or a mobile network coding. The input module 11 of the present invention provides a variety of login methods based on the components of the input module 11. For example, a touch screee, touch panel and keyboard of the input module 11 can allow the user to input an account number and a password to login; a camera of the input module 11 can be applied for face recognition login; a fingerprint scanner of the input module 11 can be used for fingerprint identification login; a microphone of the input module 11 can be used for voiceprint recognition login. In some embodiments, a first sharer can use a fingerprint identification method to access an identity code and a password which are already saved in the first sharer terminal 101 as a first sharer identity data of the data sharing system of the present invention.

In the present invention, the processing module 12 of the first sharer terminal 101 can be a central processing unit, a microprocessor, a chip set, a controller, an operating system, a driver, or an application. The communication module 13 can be a wired or wireless communication component for data exchange, such as Ethernet, Wi-Fi, Bluetooth or infrared. The display module 14 can be a component to show text, web pages, icons, digital images, video data to the user, such as an LCD screen, a touch screens, an organic light-emitting diode screen. The first sharer terminal 101, the receiver terminal 201, and the second sharer terminal 102 can be a device with functions of data input and output, data processing and communication, such as a desktop computer, a notebook computer, a mobile phone, a smart phone, a tablet computer. The possible devices are not limited to what are presented previously. The user can log in to the service server 3 through the aforementioned various terminal devices and use data sharing services on the terminal devices.

In the present invention, the receiver terminal 201 includes an input module 11, a processing module 12, a communication module 13, a display module 14. The functions of each module are described above and will not be described repeatedly. In some embodiments, the input module 11 is configured to receive a share request. The second sharer terminal 102 includes an input module 11, a processing module 12, a communication module 13, and a display module 14. The functions of each module in the second sharer terminal 102 are the same as the functions of each module in the first sharer terminal 101, and will not be described repeatedly. In some embodiments, the second sharer terminal 102 of the input module 11 can receive a second sharer identity data, a share characteristic, a second sharing command, and a second shared data. The second sharer identity data can include an identity code and a password. The identity code can be an account number, an e-mail address, a telephone number, a universally unique identifier, a globally unique identifier, an international mobile subscriber identity, or a mobile network coding.

In the present invention, the first sharer terminal 101, the receiver terminal 201, the second sharer terminal 102 of the input module 11, the processing module 12, the communication module 13 and the display module 14 can be recognized as the modules with the same or similar functions, which are installed in different terminals.

The first sharer terminal 101, the receiver terminal 201, the second sharer terminal 102, and the service server 3 transfer data to each other via the network 2. The network 2 refers to a network using various communication protocols to enable data transmission between devices, such as the Internet, an intranet, a wide area network (WAN), a local area network (LAN), a wireless network, Bluetooth, Wi-Fi, a mobile communication network. The communication protocols can be Transmission Control Protocol/Internet Protocol (TCP/IP), Hyper File Transfer Protocol (HTTP), Lightweight Directory Access Protocol (LDAP). The person of ordinary skill in the art shall understand the possible types of the networks are not limited to what are presented previously. In some embodiments, in addition to the Internet, the network 2 further includes a Content Delivery Network (CDN), a Domain Name System (DNS) or a Load Balancer, in order to transfer data, movies, applications, and Application Programming Interfaces (APIs) from device to device with low latency and high speed.

The service server 3 is computer equipment used to perform software or applications that provide the data sharing service of the present invention. The service server includes, but is not limited to, a file server, a database server, a web server, an application server. In some embodiments, the service server 3 includes: an identity verification module 31 configured to receive and verify the first sharer identity data, and save the share characteristic; a list storage module 33 configured to save a plurality of share lists; a list management module 32, according to the first sharer identity data, the first sharing command, and the share request, generating one of the plurality of share lists, or accessing, modifying, deleting, or saving at least one of the plurality of share lists which are saved in the list storage module 33; a data storage module 34 configured to save the first shared data; a function providing module 35, generating a share function list according to the share characteristic, and transmitting the share function list to the receiver terminal 201; a function execution module 36 configured to execute a share function corresponding to one of the plurality of share lists; and a notification module, generating a share data review notification to the at least one receiver terminal 201. A user sends a share data review request via at least one receiver terminal 201 to the data storage module 34, and the data storage module 34 provides the first shared data according to the share data review request to the at least one receiver terminal. In some embodiments, the service server 3 can be the Amazon Elastic Compute Cloud (Amazon EC2) to execute the aforementioned modules, to receive the data from the first sharer terminal 101, the receiver terminal 201, and the second sharer terminal 102 via the Internet and process the data. The processed results are then transmitted to the first sharer terminal 101, the receiver terminal 201, and the second sharer terminal 102 via the Internet.

The identity verification module 31 saves the information that is required to verify sharer identity. The identity verification module 31 is configured to receive and verify the first sharer identity data. The identity verification module 31 receives the identity code and the password of the first sharer from the first sharer terminal 101, and compares the received data with the data saved in the identity verification module 31. If they match to each other, the identity verification module 31 allows the first sharer to use the functions of each module in the service server 3, or allow each module in the service server 3 provides services to the first sharer. The identity verification module 31 is used to save the share characteristic of the first sharer. The share characteristic can be personal information, activity, game, sports, shopping, auction, traversal, drama, entertainment, life, performance, or news. The share characteristic is used to categorize or label the first sharer, the receiver, and the second sharers so as to facilitate to subsequently process the share lists. In some embodiments, the identity verification module 31 can be, but not limited to, at least one compatible relational database, such as a fully managed relational database (Amazon Aurora), an object-relational database server (PostgreSQL), and an open source relational database (MySQL).

The data storage module 34 is equipment to save the first shared data. In some embodiments, the data storage module 34 can be the Amazon Simple Storage Service (Amazon S3). In the other embodiment, the data storage module 34 can be an independent storage device, such as a computer or a server.

In the present invention, the list storage module 33 is configured to save a plurality of share lists. The share lists mean the share lists of the sharer. The share lists include at least identity information of a receiver, such as the name of a receiver, an account number, an e-mail address, a telephone number, a universally unique identifier, a globally unique identifier, an international mobile subscriber identity, or a mobile network coding. The identity information can also be a unique number given by a data sharing system. The list management module 32, according to the first sharer identity data, the first sharing command and the share request, generates a new share list, or saves, modifies, deletes at least one share list saved in the list storage module 33. In some embodiments, the first sharer can access a share list saved in the list storage module 33 via the list management module 32, and share the data to the receiver via the share list, so as to interact and communicate with the receiver. Besides, the first sharer can modify or delete at least one share list saved in the list storage module 33. In some embodiments, the list management module 32 is a non-relational database, to create and save form-based data, such as a share list. In some embodiments, the list management module 33 can save shared data list, such as a video list. The share function can be approval, consent, recommendation, like, sharing, comment, search, playing, pausing, forwarding, playback, purchase, payment, transfer, position, vote, sweepstakes, participation or exit.

The function providing module 35 generates a share function list according to the share characteristic of the first sharer terminal 101. The share function list is saved in the list storage module 33. The function providing module 35 transmits the share function list to the receiver terminal 201. Accordingly, the first sharer terminal 101 and the receiver terminal 201 have the same share function. In some embodiments, the first sharer selects and sets up a share function which he or she wants to share with the receiver. The share functions of the first sharer terminal 101 and the receiver terminal 201 are partially identical.

The service server 3 include at least one function execution module 36 is configured to execute functions in a share function list. The function execution module 36 can be a video player module for playing, pausing, forwarding and play back a first shared data saved in the data storage module 34. The function execution module 36 can be a payment module for purchase, payment and transfer. The function execution module 36 can be a positioning module for sending a positioning command to enable the first sharer terminal 101, the receiver terminal 201, and/or the first sharer terminal 101 to send the positioning data to the service server 3. In some embodiments, multiple function execution modules 36 of the service server 3 can be jointly or alternatively performed to provide services needed by the sharers and the receivers.

The notification module 37 generates a share data review notification to the at least one receiver terminal 201 according to the first shared data or the shared data list. For example, the notification module 37 can periodically examine the shared data in the data storage module 34 and compare with the previous examination result. When the service server 3 receives and saves the first shared data from the first sharer terminal 101, the shared data in the data storage module 34 are increased. The notification module 37 can generate a difference in the amount of the shared data between the current examination result and the previous examination result. When the difference amount is positive, the notification module 37 generates an examination notification to the at least one receiver terminal 201. The notification module 37 can also generate an examination notification to the at least one receiver terminal 201 according to an updated shared data list. The receiver can send a share data review request via the receiver terminal 201 to the data storage module 34. The data storage module 34 provides the first shared data to the receiver terminal 201 according to the share data review request.

Figure 2:
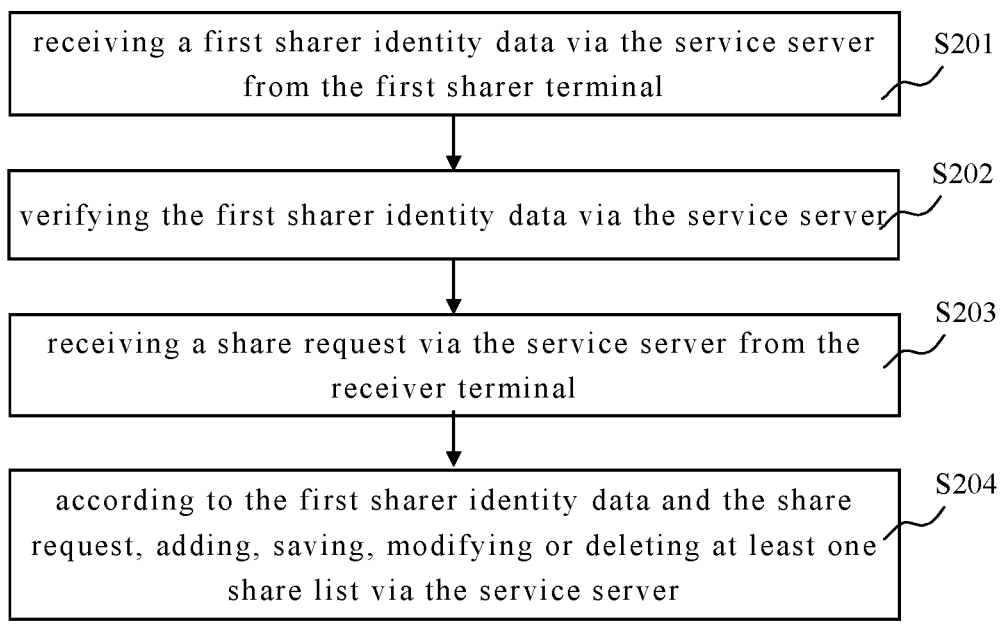
FIG. 2 is a flow diagram illustrating a share list processing method for a first sharer terminal, a receiver terminal, and a service server, in accordance with another embodiment of the present invention.

In FIG. 2, the present invention provides a share list processing for a first sharer terminal 101, a receiver terminal 201, and a service server 3. According to the demand, the first sharer can access, modify or delete the share lists saved in the service server 3 via the first sharer terminal 101.

In Step S201, the service server 3 receives a first sharer identity data from the first sharer terminal 101. For example, the first sharer inputs an identity code and a password via a smart phone, or accesses an identity code and a password saved in a smart phone via fingerprint identification. The smart phone then sends the identity code and the password to the service server 3.

In Step S202, the service server 3 verifies the first sharer identity data. For example, the service server 3 receives the identity code and the password of the first sharer from the smart phone, and then the identity verification module 31 compares the identity code and the password of the first sharer with the sharer identity saved in the identity verification module 31 to perform verification. If they match each other, the identity verification module 31 allows the first sharer to use the functions of each module in the service server 3. If they do not match each other, the service server 3 does not provide any functions of each module to the first sharer.

In Step S203, the service server 3 receives a share request from the receiver terminal 201. For example, a receiver wants to view the shared data shared by the first sharer, or to follow the channel of the first sharer. The receiver can send a share request via the smart phone to the service server 3. The share request can be a request for sharing of particular information, such as videos, music, text or a combination thereof, or a request for dynamic sharing by the first sharer.

In Step S204, according to the first sharer identity data, the first sharing command and the share request, the service server 3 adds a new share list, or accesses, modifies or deletes at least one share list. For example, the service server 3 receives the first sharer identity data from the smart phone of the first sharer to find a corresponding share list. Then, the service server 3 receives the share request from the smart phone of the receiver, and modifies or deletes the share list according to the first sharing command from the smart phone of the first sharer.

Figure 3:
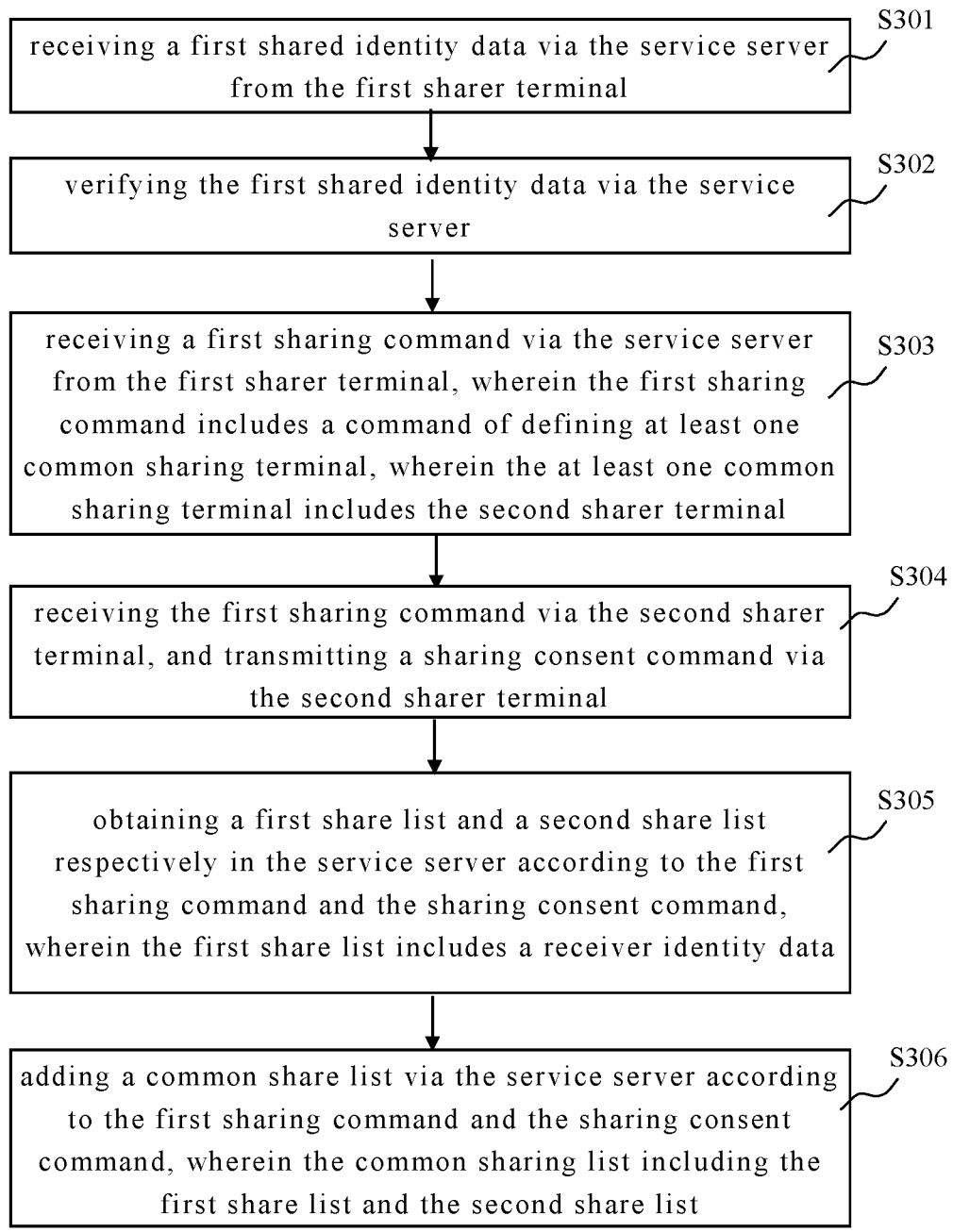
FIG. 3 is a flow diagram illustrating a share list processing method for a first sharer terminal, a receiver terminal, a second sharer terminal, and a service server, in accordance with another embodiment of the present invention.

In FIG. 3, the present invention provides a share list processing method for a first sharer terminal, a receiver terminal, a second sharer terminal, and a service server. In order for the first sharer and a second sharer to become co-sharers, the method can add a common share list without changing the corresponding share list of the sharer. The common share list includes the identity information of the first sharer, the receiver and the second sharer.

In Step S301, the service server 3 receives a first sharer identity data from the first sharer terminal 101; in Step S302, the service server 3 verifies the first sharer identity data. Step S301 and Step S302 are identical to Step S201 and Step S202 and the details will not be described repeatedly.

In Step S303, the service server 3 receives a first sharing command from the receiver terminal 201. The first sharing command includes a command of defining at least one common sharing terminal. The at least one common sharing terminal includes the second sharer terminal 102. For example, the first sharer sends a first sharing command via the smart phone to designate the second sharer terminal 102 of the second sharer as a common sharing terminal. In some embodiments, the first sharing command is a command for "joining". In the other embodiment, the first sharing command can be a command for merging, connecting, or reserve connecting, or other commands involving sharing operation.

In Step S304, the second sharer terminal 102 receives the first sharing command, and the second sharer terminal 102 sends a sharing consent command. For example, the smart phone of the second sharer obtains the first sharing command from the service server 3, and the display module 14 shows an "agree to join" diagram. The second sharer clicks the "agree to join" diagram via the input module 11 of the smart phone, and then the smart phone of the second sharer sends a sharing consent command to the service server 3.

In Step S305, the service server 3 obtains a first share list and a second share list respectively according to the first sharing command and the sharing consent command. The first share list includes a receiver identity data. The receiver identity data can be an identity code and a password. The identity code can be an account number, an e-mail address, a telephone number, a universally unique identifier, a globally unique identifier, an international mobile subscriber identity, and a mobile network coding. In some embodiments, the first share list includes a universally unique identifier, a globally unique identifier, an international mobile subscriber identity, and a mobile network coding of the receiver terminal 201. In the other embodiment, the first share list includes an account number, an e-mail address, a telephone number of the receiver of the receiver terminal 201.

In Step S306, the service server 3 adds a common share list according to the first sharing command and the sharing consent command. The common share list includes content of the first share list and the second share list. In other words, the common share list include the account numbers, the e-mail addresses, the telephone numbers, the universally unique identifiers, the globally unique identifiers, the international mobile subscriber identities, and the mobile network coding of the first sharer terminal, the receiver terminal and the second sharer terminal. For example, after the service server 3 receives a sharing consent command from the smart phone of the second sharer, it indicates that the second sharer agrees that the second sharer terminal 102 becomes a common sharing terminal with the first sharer terminal 101. The list management module 32 adds a common share list according to the sharing consent command and the first sharing command. The common share list includes the information of the first sharer terminal 101 and the second sharer terminal 102, which are the common sharing terminals to each other. The common share list is saved in the list storage module 33, and the list storage module 33 also saves the first share list of the first sharer terminal 101, the second share list of the second sharer terminal 102, and the common share list of the first sharer terminal 101, the second sharer terminal 102 and the receiver terminal 201. The second sharer terminal 102 which becomes the common sharing terminal not only receives the first shared data of the first sharer terminal 101, but also inputs a second shared data (if the second sharer terminal 102 is a smart phone) to share to the first sharer terminal 101 and the receiver terminal 201.

In some embodiments, the list storage module 33 of the service server 3 saves the share lists of the first sharer and the second sharer and the common share lists. Therefore, when the first or second sharer uploads shared data, the service server 3 can send a share notification or shared data to the receiver terminal or the sharer terminals on the lists through the common share list and the share lists of the first sharer and the second sharer. For example, when the first sharer terminal and the second sharer terminal become common sharing terminals to each other, and the first sharer provides a video through the first sharer terminal 101 and the service server 3 to the second sharer terminal 102, the service server 3 shares the video of the second sharer terminal 102 to the receiver of the first sharer terminal 101 according to the common share list and the share list of the first sharer.

In some embodiments, when the first sharer wants to stop sharing with the second sharer, the first sharer can send a sharing command to delete a sharer, and the service server 3 then deletes the common share list according to the sharing command, so that the first sharer terminal 101 and the second sharer terminal 102 are not the common sharing terminals to each other. In the other embodiment, the first sharing command of the first sharer includes a deadline for sharing. The deadline for sharing is a preset time or date, such as one hour, one day, one month or a preset data. When date set in the service server 3 exceeds the deadline for sharing, the service server 3 will delete the common share list.

Figure 4:
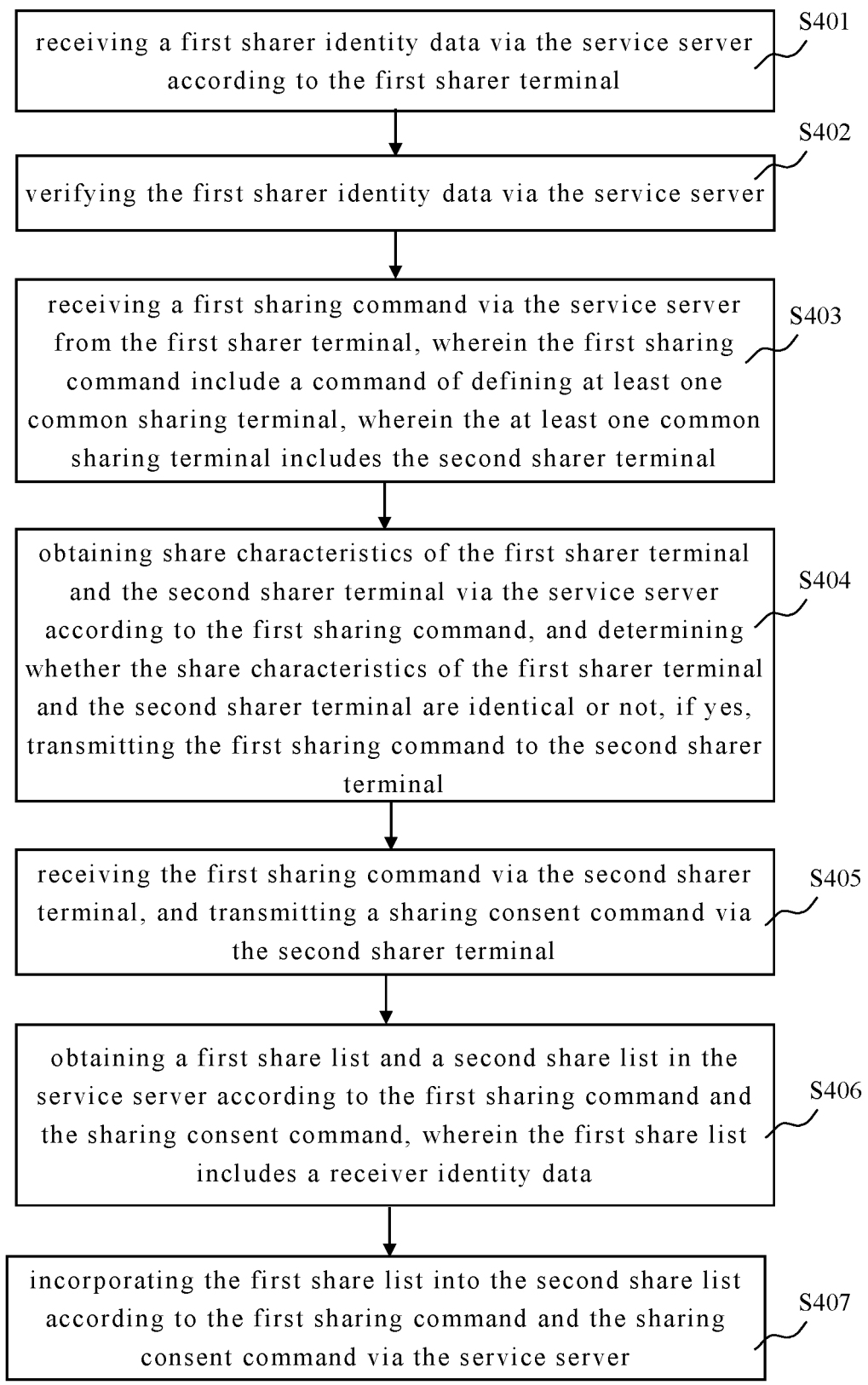
FIG. 4 is a flow diagram illustrating a share list processing method for a first sharer terminal, a receiver terminal, a second sharer terminal, and a service server, in accordance with another embodiment of the present invention.

FIG. 4 is a flow diagram illustrating a share list processing method for a first sharer terminal, a receiver terminal, a second sharer terminal, and a service server, in accordance with one embodiment of the present invention. This embodiment is used for updating the second share list as to the second sharer. In FIG. 4, Step S401 illustrates that the service server 3 receives a first sharer identity data from the first sharer terminal 101; in Step S402, the service server 3 verifies the first sharer identity data. Step S401 and Step S402 are identical to Step S301 and Step 302, and the details will not be described repeatedly.

In Step S403, the service server 3 receives a first sharing command from the receiver terminal 201. The first sharing command includes a command of defining at least one common sharing terminal. The at least one common sharing terminal includes the second sharer terminal 102. For example, the first sharer sends a first sharing command via the smart phone to designate the second sharer terminal 102 of the second sharer as a common sharing terminal. In some embodiments, the first sharing command is a command for "joining". In the other embodiment, the first sharing command can be a command for merging, connecting, or reserve connecting, or other commands involving sharing operation.

In Step S404, the service server 3 obtains share characteristics of the first sharer terminal 101 and the second sharer terminal 102 according to the first sharing command, and determines whether the first sharer terminal 101 and the second sharer terminal 102 have at least one identical share characteristic. If yes, the service server 3 sends the first sharing command to the second sharer terminal 102. For example, the service server 3 obtains the share characteristic of the first sharer according to the first sharing command from the identity verification module 31. Because the first sharing command defines the second sharer terminal as a common sharing terminal, the service server 3 obtains the share characteristic of the second sharer according to the first sharing command from the identity verification module 31. The share characteristics of the first sharer are game and entertainment, while the share characteristics of the second sharer are game and activity. Both the first sharer and the second sharer have share characteristic "game". Therefore, the service server 3 determines that the first sharer and the second sharer have a common share characteristic, and sends the first sharing command to the second sharer terminal 102. In the other embodiment, if the first sharer and the second sharer do not have a common share characteristic, the service server 3 will not send the first sharing command to the second sharer terminal 102.

In Step S405, the second sharer terminal 102 receives the first sharing command and then sends a sharing consent command. For example, the smart phone of the second sharer obtains the first sharing command from the service server 3, and the display module 14 shows an "agree to join" diagram. The second sharer clicks the "agree to join" diagram via the input module 11 of the smart phone, and then the smart phone of the second sharer sends a sharing consent command to the service server 3.

In Step S406, the service server 3 obtains a first share list and a second share list according to the first sharing command and the sharing consent command. The first share list includes a receiver identity data.

In Step S407, the service server 3 incorporates the first share list into the second share list according to the first sharing command and the sharing consent command. Incorporating refers to combining the content of the first share list with the content of the second share list. Before Step S407, the content of the second share list does not include the information of the first sharer terminal 101 and the receiver terminal 201. After Step S407, the content of the second share list will be updated to include the identity data of the first sharer terminal 101, the receiver terminal 201 and the second sharer terminal 102. For example, when the service server 3 receives a sharing consent command from the smart phone of the second sharer, it indicates that the second sharer agrees that the second sharer terminal 102 becomes a common sharing terminal with the first sharer terminal 101. The list management module 32 incorporates the first share list into the second share list according to the sharing consent command and the first sharing command. The second share list then includes the information of the first sharer terminal 101, the receiver terminal 201 and the second sharer terminal 102, which are the common sharing terminals to each other. In the other embodiment, the first share list of the first sharer terminal 101 includes data of 100 receiver terminals 201 and the second share list of the second sharer terminal 102 includes data of 200 receiver terminals 201. After Step S407 is performed, the data number of the receiver terminals 201 in the second share list may be changed from 200 to 300. If there are repeated data presented in the first share list and the second share list, after Step S407, the data number of the receiver terminals 201 in the second share list may be changed from 200 to 250.

Figure 5:
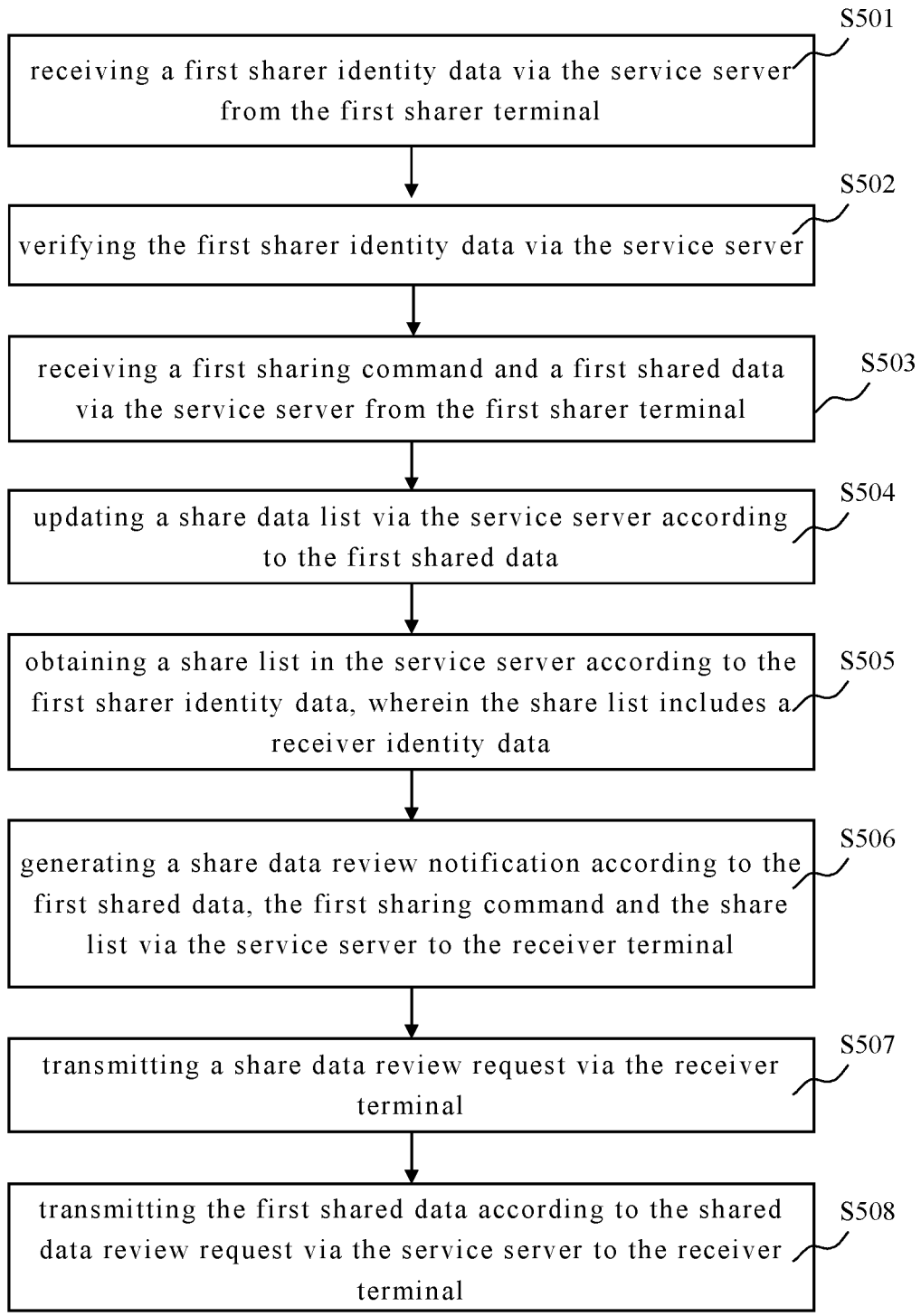
FIG. 5 is a flow diagram illustrating a method for sharing data applying among a first sharer terminal, a receiver terminal, and a service server, in accordance with another embodiment of the present invention.

In FIG. 5, the present invention provides a method for sharing data applying among a first sharer terminal 101, a receiver terminal 201, and a service server 3. The method includes the following steps. In Step S501, the service server 3 receives a first sharer identity data from the first sharer terminal 101. In Step S502, the service server 3 verifies the first sharer identity data. In Step S503, the service server 3 receives a first sharing command and a first shared data from the first sharer terminal 101. In Step S504, the service server 3 updates a share data list according to the first shared data. In Step S505, the service server 3 obtains a share list according to the first sharer identity data, and the share list includes a receiver identity data. In Step S506, the service server 3 generates a share data review notification according to the first shared data, the first sharing command and the share list to the receiver terminal 201. In Step S507, the receiver terminal 201 sends a data review request. In Step S508, the service server 3 sends the first shared data to the receiver terminal 201 according to the share data review request.

According to the aforementioned description, the person of ordinary skill in the art shall understand that the data sharing system of the present invention can add, access, modify or delete share lists and the corresponding share functions, and provide identical or different share functions and interfaces of system operator terminal according to the identity of the system operator, such as the first sharer terminal 101, the receiver terminal 201 and the second sharer terminal 102.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A data sharing system, comprising:
a first sharer terminal, including an input module, a processing module, a communication module and a display module, wherein the input module of the first sharer terminal is configured to receive a first sharer identity data, a first sharing command and one of a share characteristic and a first shared data;
at least one receiver terminal, including an input module, a processing module, a communication module and a display module, wherein the receiver terminal is configured to send a share request; and
a service server, including an identity verification module configured to receive and verify the first sharer identity data of the first sharer terminal, and to save the share characteristic of the first sharer terminal; a list storage module, configured to save a plurality of share lists; a list management module, according to the first sharer identity data and the first sharing command of the first sharer terminal and the share request of the receiver terminal, generating one of the plurality of share lists, or accessing, modifying, deleting, or saving at least one of the plurality of share lists which are saved in the list storage module; a data storage module, configured to save the first shared data; a function providing module, generating a share function list according to the share characteristic, and transmitting the share function list to the receiver terminal; a function exestuation module, configured to execute a share function corresponding to one of the plurality of share lists; a notification module, generating a share data review notification according to the first shared data to the at least one receiver terminal, wherein the at least one receiver terminal generates a share data review request to the data storage module, and the data storage module provides the first shared data according to the share data review request to the at least one receiver terminal.

2. The data sharing system of claim 1, further comprising a second sharer terminal, including an input module, a processing module, a communication module and a display module, wherein the input module of the second sharer terminal is configured to receive a second sharer identity data.

3. The data sharing system of claim 2, wherein the input module of the second sharer terminal receives a share characteristic, a second sharing command, and a second shared data.

4. The data sharing system of claim 1, wherein the input module of the first sharer terminal receives a share function execution request.

5. The data sharing system of claim 1, wherein the list storage module includes a shared data list.

6. The data sharing system of claim 1, wherein the first sharer identity data includes an identity code and a password, wherein the identity code is selected from the group consisting of an account number, an e-mail address, a telephone number, a universally unique identifier, a globally unique identifier, an international mobile subscriber identity, and a mobile network coding.

7. The data sharing system of claim 1, wherein the share characteristic is selected from the group consisting of personal information, activity, game, sports, shopping, auction, traversal, drama, entertainment, life, performance, and news.

8. The data sharing system of claim 1, wherein the first sharing command is selected from the group consisting of sharing one share list, uploading one share list, modifying one share list and deleting one share list.

9. The data sharing system of claim 1, wherein the first shared data is selected from the group consisting of video, music, images and text.

10. The data sharing system of claim 1, wherein the share function is selected from the group consisting of approval, consent, recommendation, like, sharing, comment, search, playing, pausing, forwarding, playback, purchase, payment, transfer, position, vote, sweepstakes, participation and exit.

11. The method for sharing data of claim 10, wherein the share function is selected from the group consisting of approval, consent, recommendation, like, sharing, comment, search, playing, pausing, forwarding, playback, purchase, payment, transfer, position, vote, sweepstakes, participation and exit.

12. The data sharing system of claim 2, wherein the input module of the second sharer terminal receives a share function execution request.

13. A share list processing method for a first sharer terminal, a receiver terminal, a second sharer terminal, and a service server, comprising the steps of:
receiving a first shared identity data via the service server from the first sharer terminal;
verifying the first shared identity data via the service server;
receiving a first sharing command via the service server from the first sharer terminal, wherein the first sharing command includes a command of defining at least one common sharing terminal, wherein the at least one common sharing terminal includes the second sharer terminal;
receiving the first sharing command via the second sharer terminal, and transmitting a sharing consent command via the second sharer terminal;
obtaining a first share list and a second share list respectively in the service server according to the first sharing command and the sharing consent command, wherein the first share list includes a receiver identity data of the receiver terminal; and
adding a common share list via the service server according to the first sharing command and the sharing consent command, wherein the common sharing list including the first share list and the second share list.

14. The share list processing method of claim 13, further comprising generating a common share function according to the common share list.

15. The share list processing method of claim 13, wherein the first sharer identity data includes an identity code and a password, wherein the identity code is selected from the group consisting of an account number, an e-mail address, a telephone number, a universally unique identifier, a globally unique identifier, an international mobile subscriber identity, and a mobile network coding.

16. The share list processing method of claim 13, wherein the share characteristic is selected from the group consisting of personal information, activity, game, sports, shopping, auction, traversal, drama, entertainment, life, performance, and news.

17. The share list processing method of claim 13, wherein the first sharing command is selected from the group consisting of sharing one share list, uploading one share list, modifying one share list and deleting one share list.

18. A share list processing method for a first sharer terminal, a receiver terminal, a second sharer terminal, a service server, comprising the steps of:
receiving a first sharer identity data via the service server according to the first sharer terminal;
verifying the first sharer identity data via the service server;
receiving a first sharing command via the service server from the first sharer terminal, wherein the first sharing command include a command of defining at least one common sharing terminal, wherein the at least one common sharing terminal includes the second sharer terminal;
obtaining share characteristics of the first sharer terminal and the second sharer terminal via the service server according to the first sharing command, and determining whether the share characteristics of the first sharer terminal and the second sharer terminal are identical or not, if yes, transmitting the first sharing command to the second sharer terminal;
receiving the first sharing command via the second sharer terminal, and transmitting a sharing consent command via the second sharer terminal;
obtaining a first share list and a second share list in the service server according to the first sharing command and the sharing consent command, wherein the first share list includes a receiver identity data of the receiver terminal; and
incorporating the first share list into the second share list according to the first sharing command and the sharing consent command via the service server.

19. The share list processing method of claim 18, further comprising generating a common share function according to the common share list.

20. The share list processing method of claim 18, wherein the first sharer identity data includes an identity code and a password, wherein the identity code is selected from the group consisting of an account number, an e-mail address, a telephone number, a universally unique identifier, a globally unique identifier, an international mobile subscriber identity, and a mobile network coding.

21. The share list processing method of claim 18, wherein the share characteristic is selected from the group consisting of personal information, activity, game, sports, shopping, auction, traversal, drama, entertainment, life, performance, and news.

22. The share list processing method of claim 18, wherein the first sharing command is selected from the group consisting of sharing one share list, uploading one share list, modifying one share list and deleting one share list.

23. A method for sharing data applying among a first sharer terminal, a receiver terminal and a service server, comprising the steps of:
receiving a first sharer identity data via the service server from the first sharer terminal;
verifying the first sharer identity data via the service server;
receiving a first sharing command and a first shared data via the service server from the first sharer terminal;
updating a share data list via the service server according to the first shared data;
obtaining a share list in the service server according to the first sharer identity data, wherein the share list includes a receiver identity data of the receiver terminal;
generating a share data review notification according to the first shared data, the first sharing command and the share list via the service server to the receiver terminal;
transmitting a share data review request via the receiver terminal; and
transmitting the first shared data according to the shared data review request via the service server to the receiver terminal.

24. A non-transitory machine-readable medium, including an executable command to enable one or more processing units to perform a share list processing method for a first sharer terminal, a receiver terminal, a second sharer terminal and a service server, the method comprising the steps of:
receiving a first shared identity data via the service server from the first sharer terminal;
verifying the first shared identity data via the service server;
receiving a first sharing command via the service server from the receiver terminal, wherein the first sharing command includes a command of defining at least one common sharing terminal, wherein the at least one common sharing terminal includes the second sharer terminal;
receiving the first sharing command via the second sharer terminal, and transmitting a sharing consent command via the second sharer terminal;
obtaining a first share list and a second share list respectively in the service server according to the first sharing command and the sharing consent command, wherein the first share list includes a receiver identity data of the receiver terminal; and
adding a common share list via the service server according to the first sharing command and the sharing consent command, wherein the common sharing list including content in the first share list and the second share list.

25. A non-transitory machine-readable medium, including an executable command to enable one or more processing units to perform a share list processing method for a first sharer terminal, a receiver terminal, a second sharer terminal and a service server, the method comprising the steps of:
receiving a first sharer identity data via the service server from the first sharer terminal;
verifying the first sharer identity data via the service server;
receiving a first sharing command via the service server from the receiver terminal, wherein the first sharing command includes a command of defining at least one common sharing terminal, wherein the at least one common sharing terminal includes the second sharer terminal;
obtaining share characteristics of the first sharer terminal and the second sharer terminal via the service server according to the first sharing command, and determining whether the share characteristics of the first sharer terminal and the second sharer terminal are identical or not, if yes, transmitting the first sharing command to the second sharer terminal;
receiving the first sharing command via the second sharer terminal, and transmitting a sharing consent command via the second sharer terminal;

obtaining a first share list and a second share list in the service server according to the first sharing command and the sharing consent command, wherein the first share list includes a receiver identity data of the receiver terminal; and incorporating the first share list into the second share list according to the first sharing command and the sharing consent command via the service server.

26. A non-transitory machine-readable medium, including an executable command to enable one or more processing units to perform a share list processing method for a first sharer terminal, a receiver terminal, a service server, the method comprising the steps of:

receiving a first sharer identity data from the service server;

verifying the first sharer identity data via the service server;

receiving a first sharing command and a first shared data via the service server from the first sharer terminal;

updating a share data list via the service server according to the first shared data;

obtaining a share list in the service server according to the first sharer identity data, wherein the share list includes a receiver identity data of the receiver terminal;

generating a share data review notification according to the first shared data, the first sharing command and the share list via the service server to the receiver terminal;

transmitting a share data review request via the receiver terminal; and transmitting the first shared data according to the shared data review request via the service server to the receiver terminal.

\* \* \* \* \*